(12) United States Patent
Ma (10) Patent No.: US 12,547,828 B2
(45) Date of Patent: Feb. 10, 2026

(54) TRAFFIC-BASED GPU LOAD ROUTING WITHIN LLM CLUSTERS

(71) Applicant: Cisco Technology, Inc., San Jose, CA (US)

(72) Inventor: Xueqiang Ma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 18/419,943

(22) Filed: Jan. 23, 2024

(65) Prior Publication Data

US 2025/0238608 A1    Jul. 24, 2025

(51) Int. Cl.
*G06F 9/50* (2006.01)
*G06F 40/20* (2020.01)

(52) U.S. Cl.
CPC ............ *G06F 40/20* (2020.01); *G06F 9/5072* (2013.01); *G06F 9/505* (2013.01)

(58) Field of Classification Search
CPC ........... G06F 9/50; G06F 9/505; G06F 9/5072
See application file for complete search history.

(56) References Cited

U.S. PATENT DOCUMENTS

| | | | |
|---|---|---|---|
| 2015/0243285 A1 | 8/2015 | Lane et al. | |
| 2019/0324820 A1* | 10/2019 | Krishnan | G06F 9/5077 |
| 2021/0326171 A1* | 10/2021 | Riesen | G06F 9/4856 |
| 2022/0005147 A1 | 1/2022 | Khalid et al. | |
| 2023/0297696 A1 | 9/2023 | Rogers et al. | |

FOREIGN PATENT DOCUMENTS

| | | |
|---|---|---|
| CN | 116127046 A | 5/2023 |
| WO | 2022271990 A1 | 12/2022 |

OTHER PUBLICATIONS

Dixit A., et al., "On the Impact of Packet Spraying in Data Center Networks", 2013 Proceedings IEEE INFOCOM, Apr. 14-19, 2013, 9 pages.
Lenovo: "Reference Architecture for Generative AI Based on Large Language Models (LLMs) Reference Architecture", Lenovo Press, Dec. 15, 2023, pp. 1-57.
Nvidia: "NVIDIA DGX SuperPOD: Next Generation Scalable Infrastructure for AI Leadership", Sep. 22, 2023, 27 Pages.
Wang W., et al., "How to Build Low-cost Networks for Large Language Models Without Sacrificing Performance)?", arXiv:2307.12169v3 [cs.NI], Nov. 1, 2023, pp. 1-17.

* cited by examiner

*Primary Examiner* — Tom Y Chang
(74) *Attorney, Agent, or Firm* — Lee & Hayes, P.C.

(57) ABSTRACT

In one implementation, a method is disclosed comprising: determining, for each GPU of a GPU cluster, intra-domain traffic conditions of intra-domain interconnections between GPUs within their respective GPU domain of the GPU cluster and inter-domain rail traffic conditions of inter-domain interconnections to other interconnected GPU domains of the GPU cluster; identifying, based on a comparison of the intra-domain traffic conditions and the inter-domain rail traffic conditions for a particular source GPU and a particular destination GPU, a workload routing path between the particular source GPU and the particular destination GPU; and causing an LLM workload to be distributed from the particular source GPU to the particular destination GPU according to the workload routing path.

20 Claims, 8 Drawing Sheets

TRAFFIC-BASED GPU LOAD ROUTING WITHIN LLM CLUSTERS

TECHNICAL FIELD

The present disclosure relates generally to computer networks, and, more particularly, to traffic-based graphics processing unit (GPU) load routing within Large Language Model (LLM) clusters.

BACKGROUND

Data center networks are experiencing a significant surge in the demand for resources due to the rapid growth of artificial intelligence/machine learning (AI/ML) applications. For example, ChatGPT has rapidly emerged as one of the fastest-growing applications, and its core technology, known as Large Language Models (LLM), (including its extension, Large Multi-modal Models (LMM)), has garnered significant attention in various research areas, including networking.

Currently, models can have trillions of parameters and take months to train. Training LLMs with trillions of parameters demands substantial AI acceleration resources, such as graphics processing units (GPUs). With the continuous growth in LLM sizes and the slowdown of Moore's Law, there's increasing demand to connect GPUs together to form a high-capacity GPU cluster to meet these requirements.

A GPU-centric cluster may employ different types of interconnection domains. For example, a high-bandwidth domain may be employed where a few GPUs are interconnected with high bandwidth, but short-range communication links (e.g., "NVlinks", as will be understood by those skilled in the art). Another domain interconnection may be employed that forms a network capable of any-to-any GPU communication using remote direct access memory (RDMA)-capable network interface cards (NICs).

However, scaling up these RDMA networks to tens of thousands of GPUs can be challenging. Currently, there is an absence of a mechanism to intelligently route data between GPUs in a manner that can make efficient use of both data and model parallelism. Consequently, existing large-scale RDMA networks are prone to deadlocking and priority-based flow control (PFC) storms that degrade performance.

BRIEF DESCRIPTION OF THE DRA WINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device may determine, for each GPU of a GPU cluster, intra-domain traffic conditions of intra-domain interconnections between GPUs within their respective GPU domain of the GPU cluster and inter-domain rail traffic conditions of inter-domain interconnections to other interconnected GPU domains of the GPU cluster. The device may identify, based on a comparison of the intra-domain traffic conditions and the inter-domain rail traffic conditions for a particular source GPU and a particular destination GPU, a workload routing path between the particular source GPU and the particular destination GPU.

Then, the device may cause an LLM workload to be distributed from the particular source GPU to the particular destination GPU according to the workload routing path.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
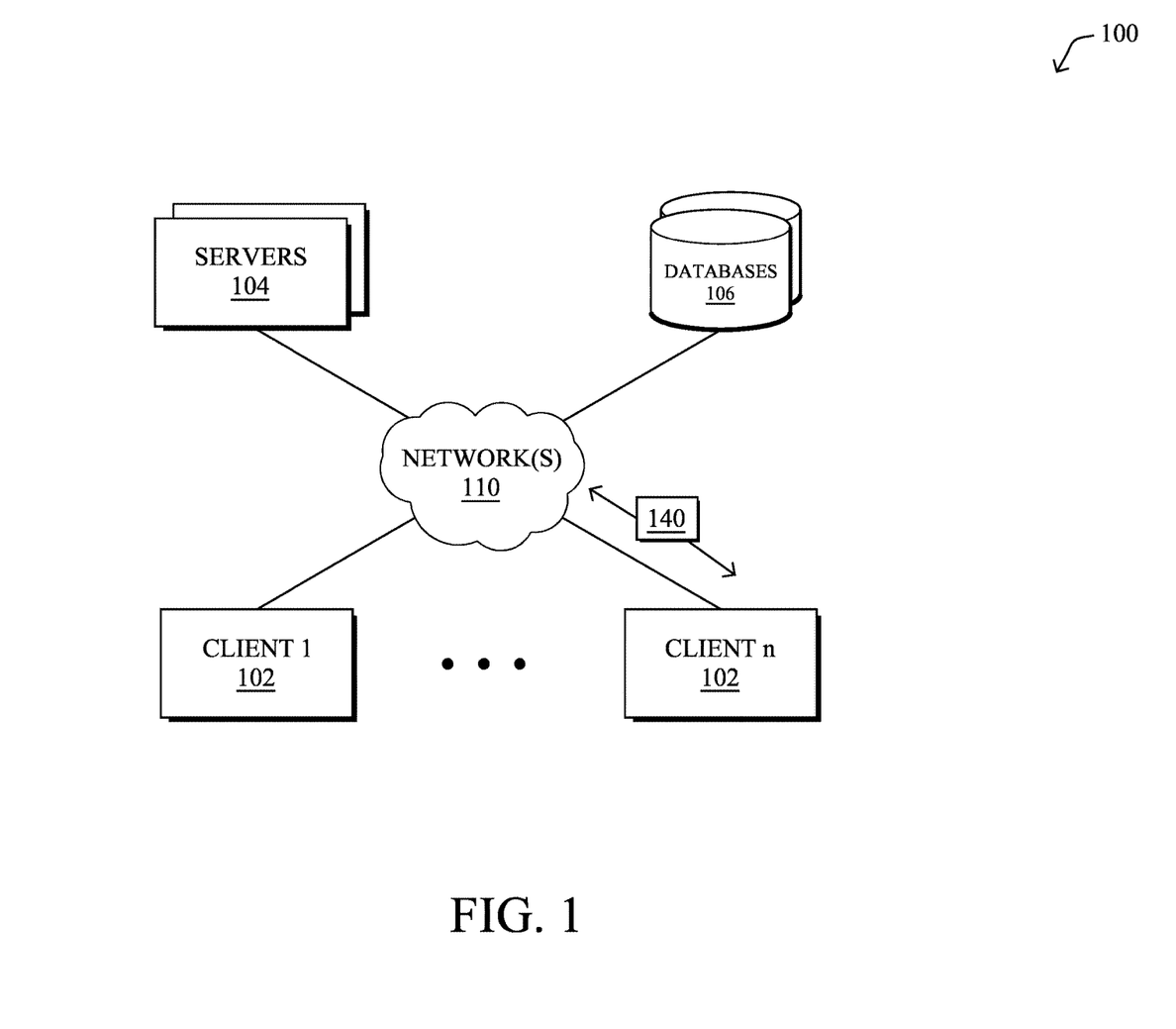
FIG. 1 illustrates an example computing system.

FIG. 1 is a schematic block diagram of an example simplified computing system (e.g., computing system 100) illustratively comprising any number of client devices (e.g., client devices 102 (e.g., a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
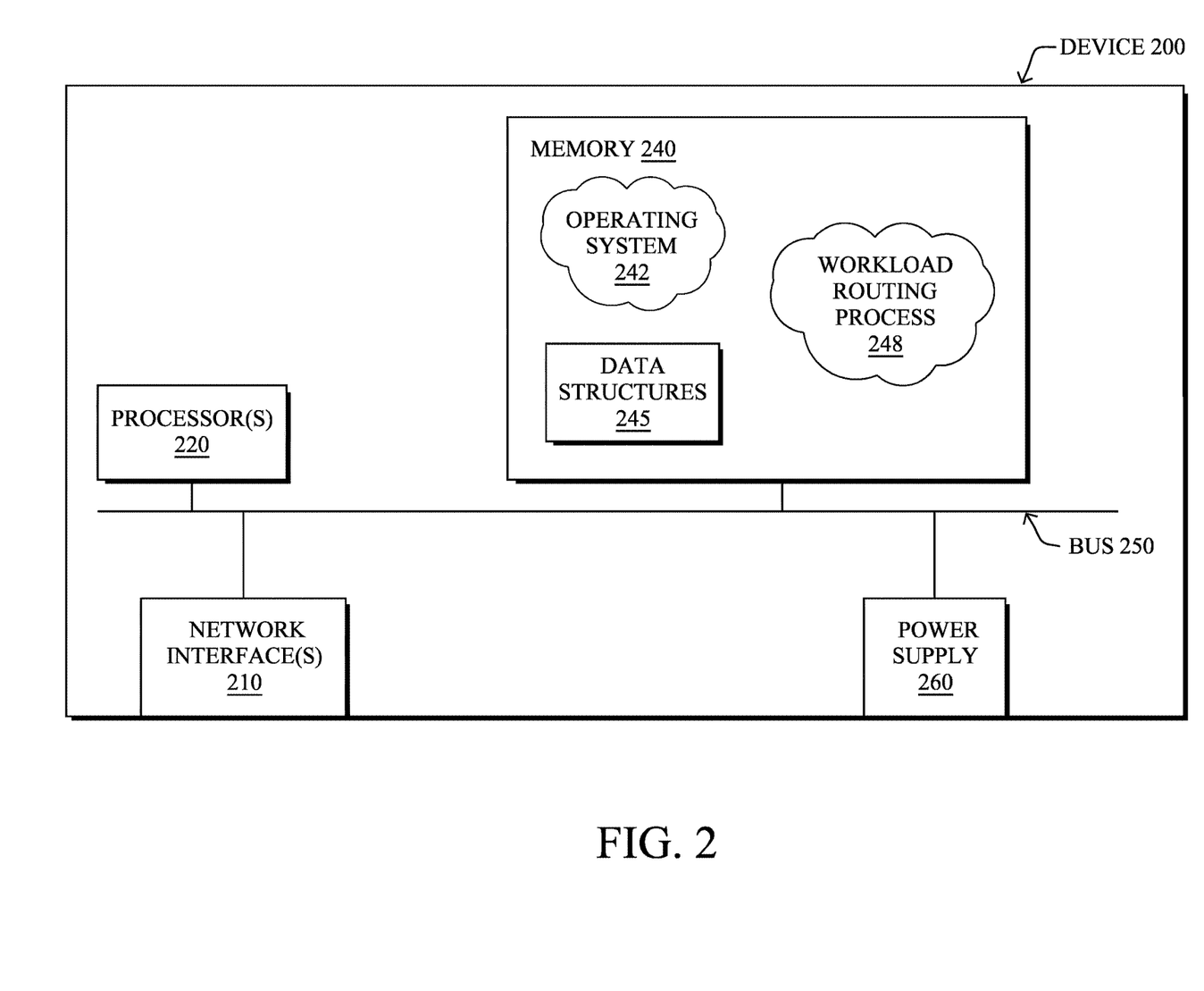
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise workload routing process 248, as described herein, which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, workload routing process 248 may include computer executable instructions that, when executed by processor(s) 220, cause device 200 to perform the techniques described herein. To do so, in some implementations, workload routing process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, workload routing process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that workload routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

In further implementations, workload routing process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, workload routing process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, workload routing process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

Traffic-Based GPU Load Routing Within LLM Clusters

As noted above, in the field of large-scale AI and ML several critical shortcomings exist, particularly in the context of training large language models (LLMs) like those used in advanced applications such as ChatGPT. For example, network congestion and inefficiency in large-scale GPU clusters imposes a significant resource drain and performance cost in training these models. For instance, traditional network architectures often struggle with congestion, particularly as the size and complexity of LLMs continue to grow. This congestion leads to inefficiencies in data transfer and can significantly prolong the training process.

Further, traditional data routing mechanisms in data centers often require complex calculations and may not be optimal for the specific demands of LLM training. Therefore, they do not offer a solution that can ameliorate the above-noted deficiencies. Furthermore, existing routing mechanisms are non-extensible and therefore limited to specific types of network traffic or topologies in addition to being static and unable to adapt to changing network conditions.

In short, conventional approaches to workload routing are not up to the task of efficiently transporting LLM workload data from one GPU to another in a distributed LLM training setup. For one, there is no generalized LLM workload routing mechanism that can leverage underlying LLM cluster network topology while remaining agnostic to specific proprietary interconnection technologies (e.g., NVLink, InfiniBand, etc.). Processing LLM workloads is a relatively new application for data center networking and it has its unique combination of network inter-connections technologies and topologies. None of the existing approaches to data routing can provide an extensible model that takes advantage of the unique characteristics of LLM/DNN (Deep Neural Networks).

Further, in conventional approaches, no simple metrics are defined that characterize traffic conditions in a manner sufficient to facilitate efficient routing decisions. Metrics that capture the essence of L2/L3 data traffic between GPUs, are generic, and yet hide internal proprietary topologies so that a model such as the one introduced herein is generic and not tied to a specific vendor or version of the current LLM training setups may be transformative to the task of workload routing.

Furthermore, data forwarding decisions should be simple, not involving heavy computation in real-time. Unfortunately, existing approaches are unable to offer such a simplified approach. Instead, conventional data routing can be temporally and computationally intensive on the scale necessary to train an LLM model.

In addition, conventional approaches to traffic routing are static and inflexible while traffic data traffic conditions are highly variable. As a result, current approaches are unable to adapt to the reality of the ever-changing traffic pattern within those hyper-bandwidth domains (such as those circuit-switching connections with NVLinks) and RDMA capable connections (such as InfiniBand, RoCEv2, or Ultra Ethernet connections).

In contrast, the techniques herein introduce an AI/ML workload routing architecture that incorporates extensible traffic condition metrics within data center topologies to achieve adaptable and intelligent data routing between GPUs. These techniques accelerate computationally intensive tasks such as generative AI training while conserving computational resource demands. The techniques introduce a model that takes advantage of the unique characteristics of LLM/DNN and networking topology over GPU domains/rails, metrics to capture traffic conditions that facilitate efficient routing decisions, and a mechanism that facilitates globally optimal end-to-end routing decisions to be determined based on the source GPU and destination GPU.

For instance, the techniques herein provide a general network model with generalized routing metrics designed for data centers tailored to LLM training. This model may be built upon high-bandwidth GPU domains interconnected by optimized rails. It may utilize a global distributed registry to collect and distribute normalized traffic health indications (e.g., scores) for each domain and a sorted list of health indications for all rails. These indications may then be employed to efficiently calculate network path traffic indications (e.g., scores).

Additionally, these techniques introduce a health ratio metric for each GPU. These ratios may facilitate the efficient determination of LLM traffic routing decisions based (e.g., solely) on the source and destination health ratios. Utilizing these techniques, the optimal path from the source to the destination may only depend on whether the ratio metric of the source is larger than the destination or not, regardless of the intermediate nodes in between. This may facilitate efficient AI traffic routing between GPUs. This approach can be uniformly applied to different types of LLM traffic, including intra-domain traffic, same-rail traffic, and across-rail traffic. Furthermore, this mechanism may be extended to determine the optimal utilization of remote rails for routing traffic when local rails become congested.

Illustratively, the techniques described herein may be performed by hardware, software, and/or firmware, such as in accordance with data compliance resolution and workload routing process 248, which may include computer executable instructions executed by the processor(s) 220 (or independent processor of network interfaces 210) to perform functions relating to the techniques described herein.

Specifically, according to various implementations, a device may determine, for each GPU of a GPU cluster, intra-domain traffic conditions of intra-domain interconnections between GPUs within their respective GPU domain of the GPU cluster and inter-domain rail traffic conditions of inter-domain interconnections to other interconnected GPU domains of the GPU cluster. The device may identify, based on a comparison of the intra-domain traffic conditions and the inter-domain rail traffic conditions for a particular source GPU and a particular destination GPU, a workload routing path between the particular source GPU and the particular destination GPU. Then, the device may cause an LLM workload to be distributed from the particular source GPU to the particular destination GPU according to the workload routing path.

Figure 3:
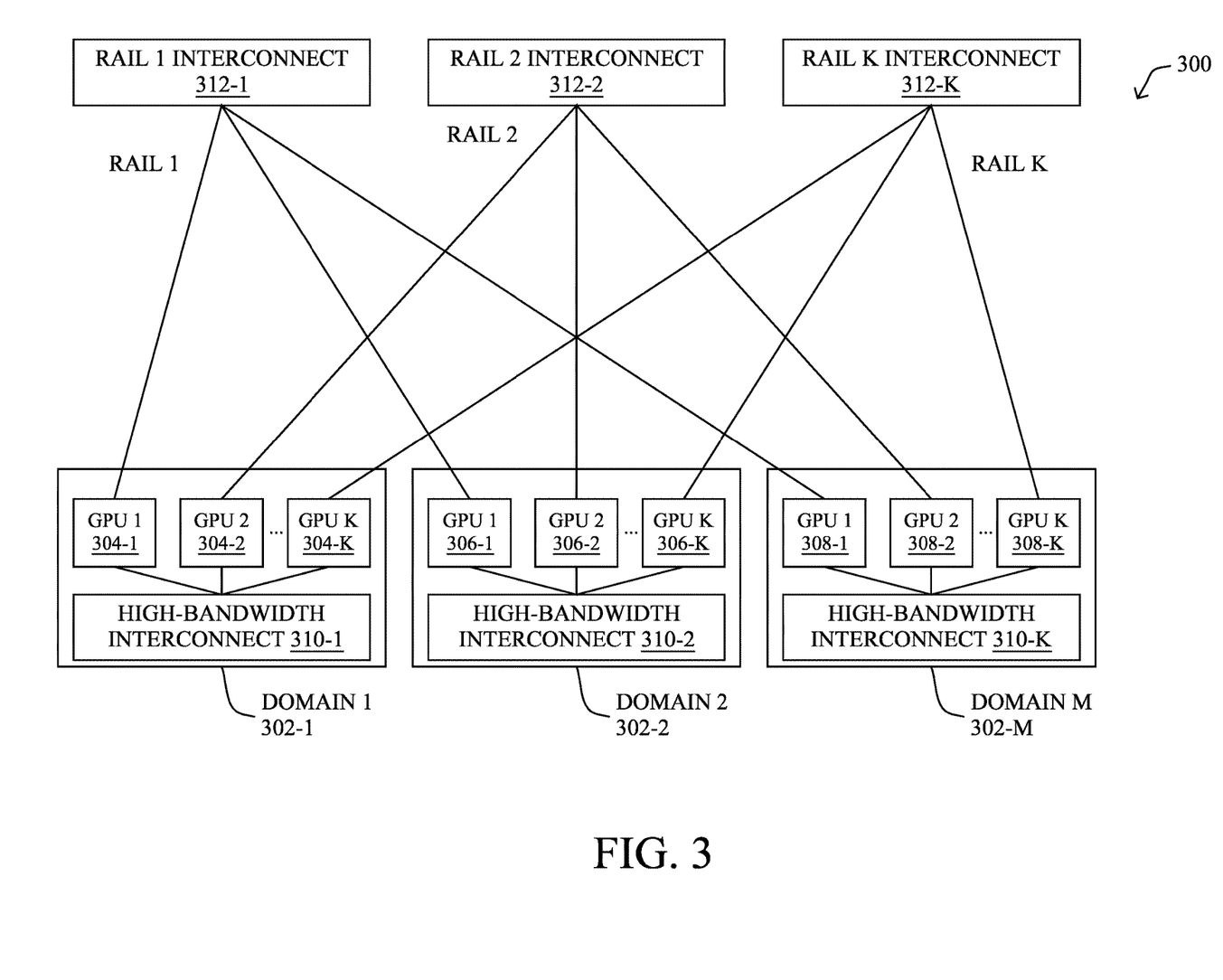
FIG. 3 illustrates an example pf an LLM cluster architecture for traffic-based GPU traffic routing within LLM clusters.

Operationally, and according to various implementations, the techniques herein may be utilized to route LLM traffic within an LLM cluster architecture. FIG. 3 illustrates a simplified example of an LLM cluster architecture 300 for traffic-based GPU traffic routing within LLM clusters. LLM cluster architecture 300 may be an underlying network connection architecture with a "rail-only connections" reference network topology.

A rail-only connection topology may be optimized for LLM training workloads in data centers. While the implementations described herein are largely illustrated in terms of this architecture, it should be appreciated by those skilled in the art that these same techniques may be extended to traditional fat-tree Clos data center network architecture and/or other network architectures which may be supported in legacy and future data center networking solutions.

LLM cluster architecture 300 may include M of high-bandwidth domains 302 (e.g., 302-1 . . . 302-M). Each of the high-bandwidth domains 302 may contain K GPUs (e.g., domain 1 GPUs 304 (e.g., 304-1 . . . 304-K), domain 2 GPUs 306 (e.g., 306-1 . . . 306-k), domain M GPUs 308 (e.g., 308-1 . . . 308-K)) with high-speed any-to-any interconnections (e.g., NVLink/NVSwitch) and K rail switches. Each rail switch, or simply rail, may connect the M GPUs with the same order number (e.g., referred to as ranking) within each of the high-bandwidth domains 302.

For instance, each of the GPUs may include two communication interfaces. A first of these interfaces may be a local interface to support high-bandwidth but short-range interconnection (e.g., across high-bandwidth interconnect 310 (e.g., 310-1 . . . 310-K). This first interface may be referred to as a "d-interface' that facilitates any-to-any interconnect within a high-bandwidth domain. The high-bandwidth interconnect 310 may connect K GPUs to provide non-blocking any-to-any bandwidth in/out per GPU. A grouping of GPUs sharing this high-bandwidth interconnect 310 may form a high-bandwidth domain.

A second of these interfaces may be referred to as an "r-interface" that connects to a rail switch 312 (e.g., 312-1 . . . 312-K). The second interface may be a remote direct memory access (RDMA) capable network interface card.

GPUs within a high-bandwidth domain may be labeled from 1 to K as their rank in these networks. A rail may be the set of GPUs with the same rank on different high-bandwidth domains, interconnected with a rail switch 312. For instance, "Rail 1" and "Rail K" are illustrated as connected to spine switches facilitating a full-bisection any-to-any Clos network topology and ensuring communication between any pair of GPUs within different high-bandwidth domains. The techniques described herein may be leveraged to route traffic (e.g., LLM workloads) within this topology and similar topologies as outlined below.

Figure 4:
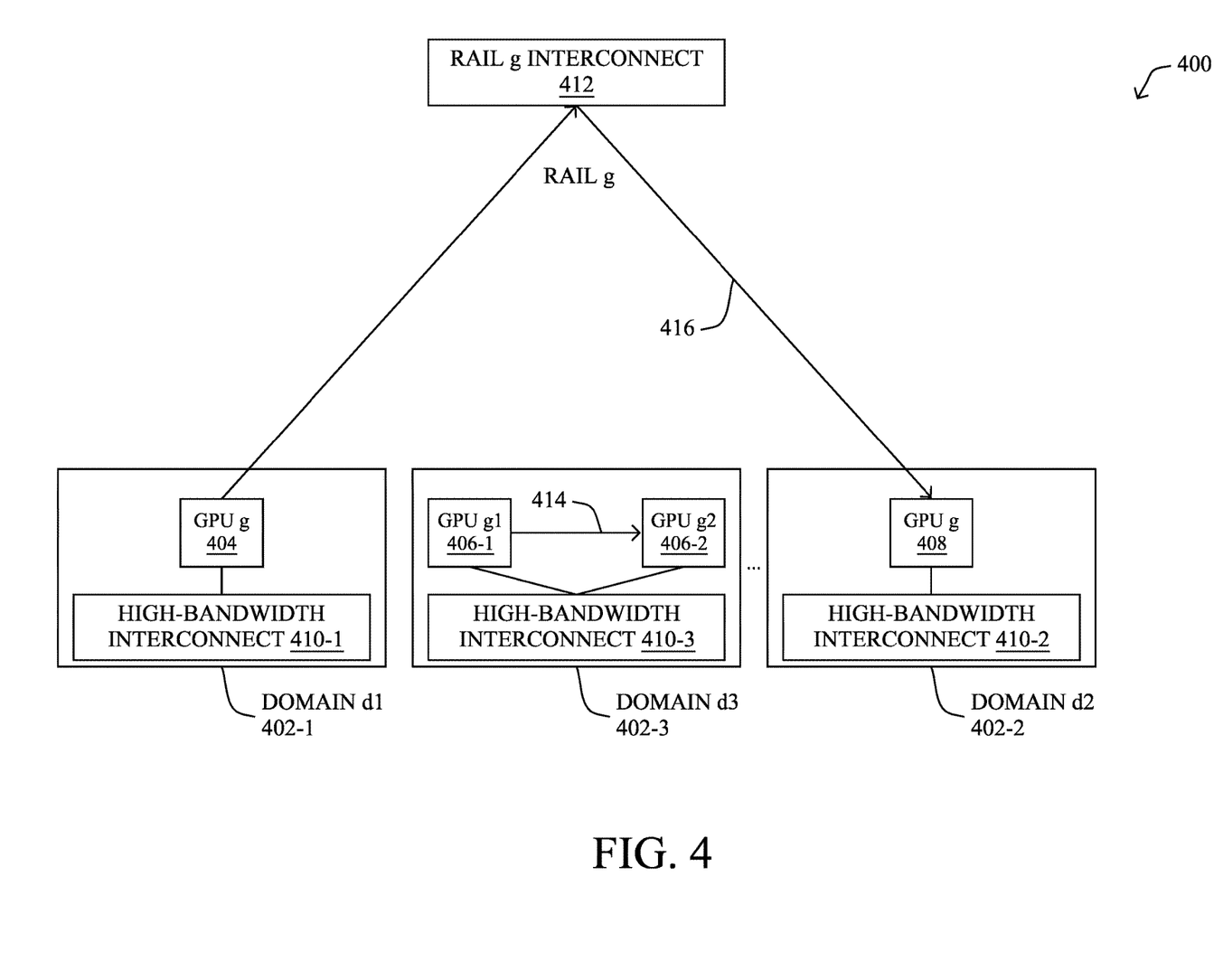
FIG. 4 illustrates an example of traffic routing within an LLM cluster architecture.

FIG. 4 illustrates an example of traffic routing within an LLM cluster architecture 400 in accordance with traffic-based GPU traffic routing within LLM clusters. LLM cluster architecture 400 may include high-bandwidth domains 402 (e.g., 402-1 . . . 402-3), high-bandwidth interconnects 410 (e.g., 410-1 . . . 410-3), GPUs (e.g., 404, 406-1, 406-2, 408), a rail switch 412, etc.

Here, G (d, g) may represent the g-th GPU in domain d. To support distributed deep neural network (DNN) training and inference with stochastic gradient descent (SGD) iteration and parallelization strategies, each GPU has the d and r interfaces outlined above. Again, the d-interface may facilitate any-to-any interconnect within a high-bandwidth domain, while the r-interface may be a RDMA-capable NIC connected to a rail switch 412.

The techniques described herein may introduce a mechanism to intelligently move LLM workloads between GPUs. For instance, LLM traffic may be routed from a source GPU G1 (G(d1, g1)) to destination GPU G2 (G(d2, g2)). This may unfold across various source to destination relationships in the LLM cluster architecture 400.

For example, in a first case G1 (e.g., 406-1) and G2 (e.g., 406-2) may be within a same domain (e.g., 402-3). Therefore, d1=d2. In such a case, G1's d-interface may be utilized in order to route traffic (e.g., 414) across high-bandwidth interconnect (e.g., 410-3) to G2. That is, intra-domain traffic (e.g., 414) may be routed between GPU (d3, g1) and GPU (d3, g2) via high-bandwidth interconnect (e.g., 410-3).

In a second case, G1 (e.g., 404) and G2 (e.g., 408) may be within different domains (e.g., 402-1 and 402-2). In this case, both GPUs may be on the same rail such that g1=g2. Therefore, G1's r-interface may be utilized in order to route traffic (e.g., 416) across a rail switch 412 to G2. That is, inter-domain traffic (e.g., 416) may be routed between GPU (d1, g) and GPU (d2, g) via rail switch 412 connecting the identically ranked source and destination GPUs. In addition, the techniques described herein may be configured to identify and account for traffic conditions at a rail switch in making routing decisions as outlined in greater detail below.

Figure 5A:
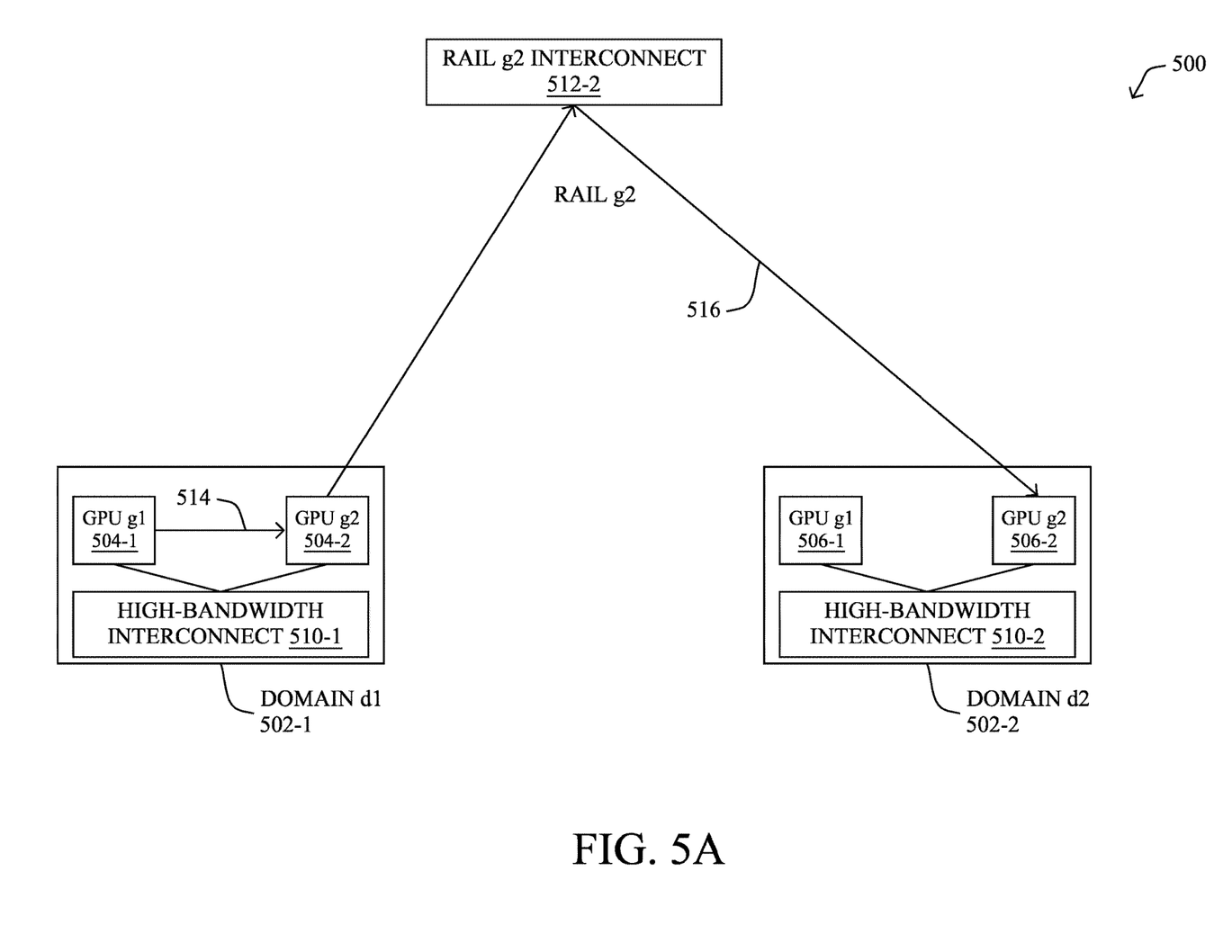
FIGS. 5A-5B illustrates examples of traffic routing within an LLM cluster architecture.
Figure 5B:
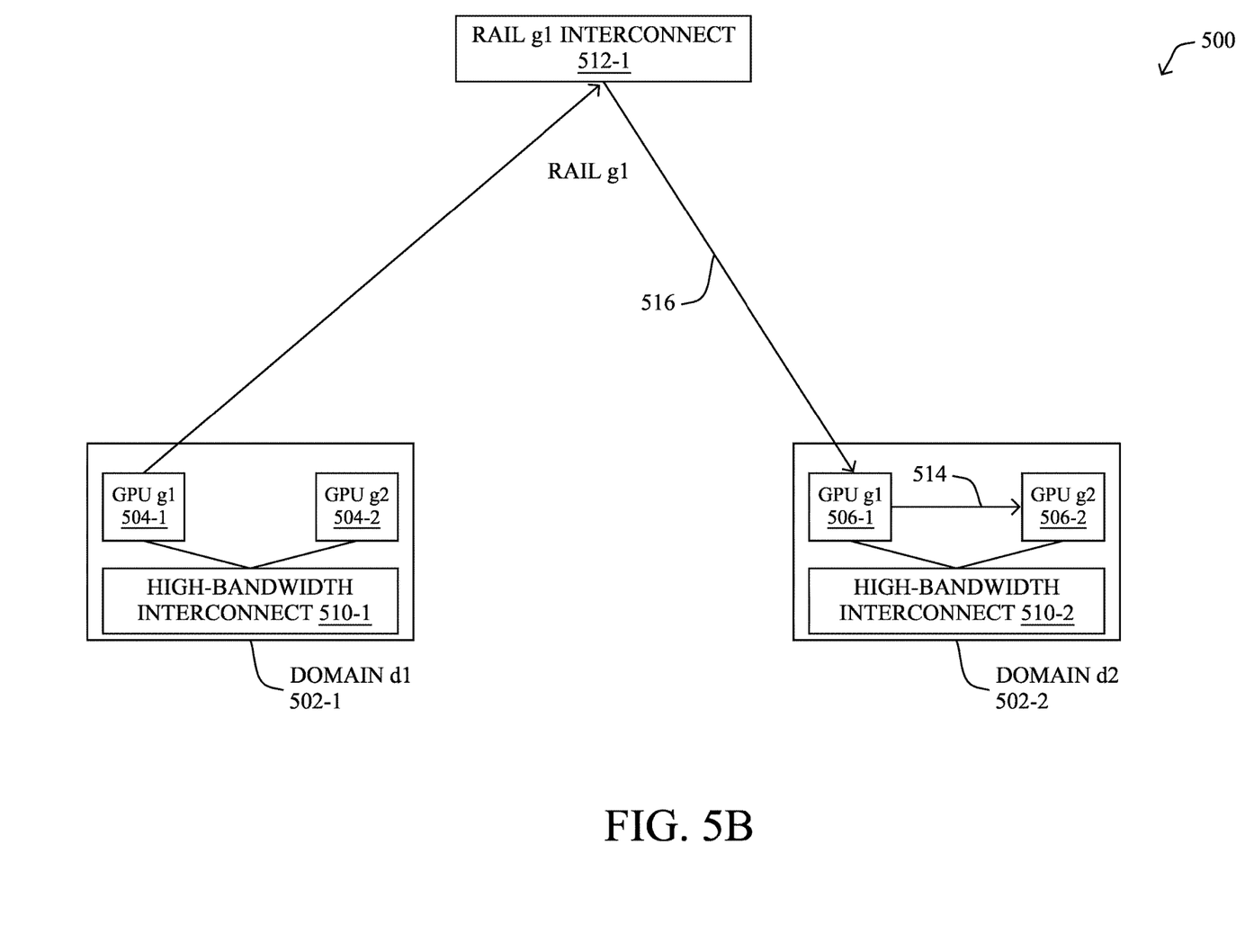

FIGS. 5A-5B illustrate examples of traffic routing within an LLM cluster architecture 500 in accordance with traffic-based GPU traffic routing within LLM clusters. LLM cluster architecture 500 may include high-bandwidth domains 502 (e.g., 502-1 and 502-2), high-bandwidth interconnects 510 (e.g., 510-1 and 510-2), GPUs (e.g., 504-1, 504-2, 506-1, and 506-2), a rail switch 512, etc.

Here, the source GPU G1 and the destination GPU G2 are in different domains (e.g., 502-1 and 502-2) and on different rails (e.g., 512-1 and 512-2). Therefore, two hops will be needed for traffic to reach G2 from G1. This can be accomplished utilizing two different routing strategies.

For example, a workload may be moved across a d-interface of G1 to route the workload as intra-domain traffic (e.g., 514) to G (d1, g2) (e.g., 504-2) within the same domain d1 (e.g., 502-1) as the next hop and then from there take the r-interface of G to route the workload as inter-domain traffic (e.g., 516) across rail g2 (e.g., 512-2) to reach G2 (e.g., 506-2). That is, GPU traffic may be routed from GPU (d1, g1) to GPU (d2, g2) via rail g2, as illustrated in FIG. 5A. This path may be referred to as an "dr-path".

In another example, the workload may be routed across an r-interface of G1 across rail g1 as inter-domain traffic (e.g., 516) to G (d2, g1) (e.g., 506-1) in domain d2 (e.g., 502-2). Then, the workload may be routed across the d-interface of G as intra-domain traffic (e.g., 514) to reach G2 (e.g., 506-2) within domain d2. That is, GPU traffic may be routed from GPU (d1, g1) to GPU (d2, g2) via rail g1, as illustrated in FIG. 5B. This path may be referred to as an "rd-path".

Figure 6:
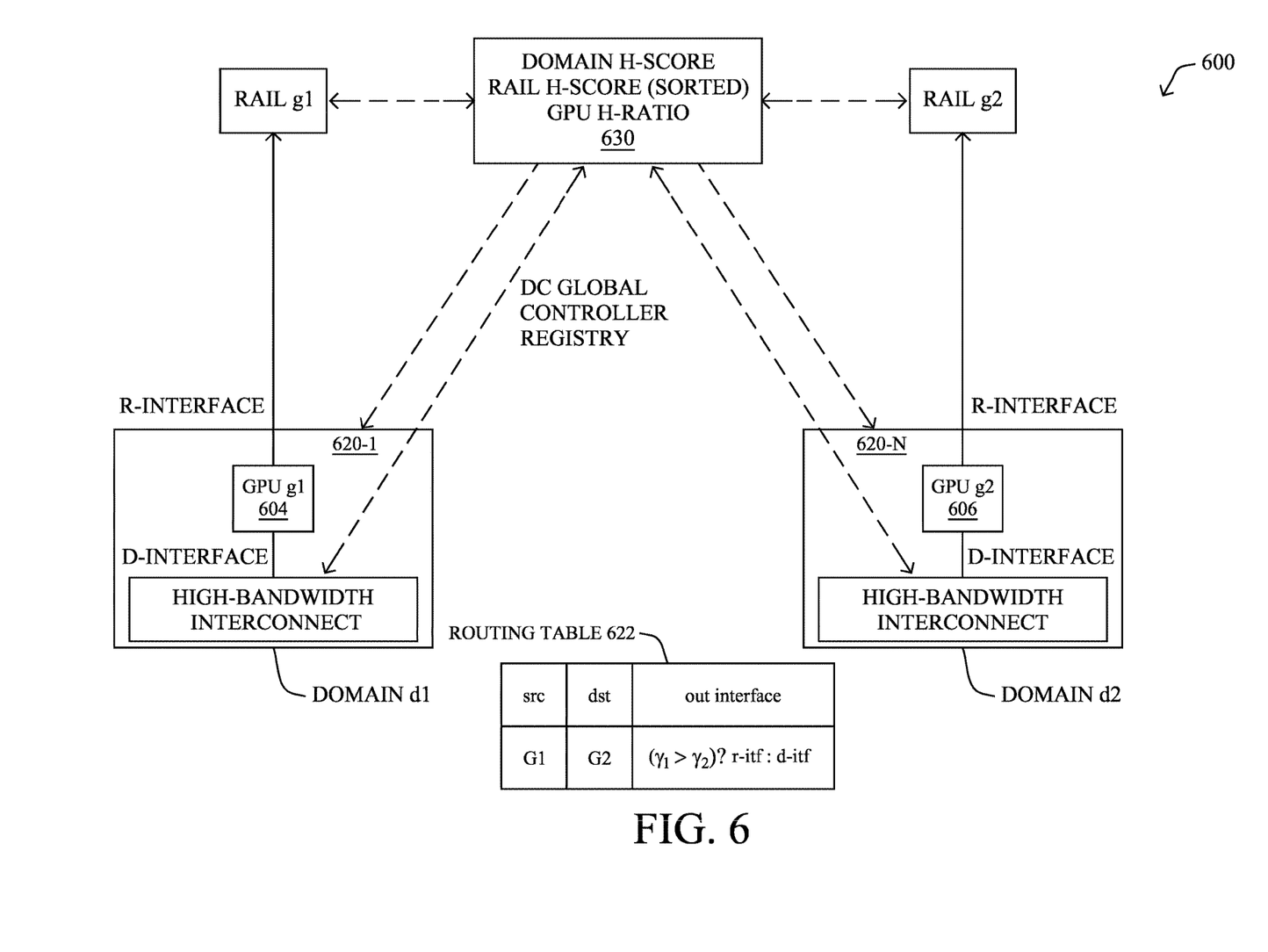
FIG. 6 illustrates an example of traffic-based GPU load routing within an LLM cluster architecture.

FIG. 6 illustrates an example of traffic-based GPU load routing within an LLM cluster architecture 600. From a traffic optimization standpoint, the route along which traffic is routed within an LLM cluster may depend on the dynamic traffic conditions within that LLM cluster architecture 600. As such, the techniques described herein introduce and leverage LLM cluster traffic condition models and metrics to capture and update the traffic conditions in a cohesive manner. These models may facilitate an efficient LLM workload routing mechanism that is optimized to the actual conditions being experienced with the LLM cluster architecture 600.

For example, several metrics may be utilized to represent the traffic condition of components within the LLM cluster. These metrics may be indications of traffic conditions of various interconnections (e.g., inter-domain connections, intra-domain connections, etc. These metrics may be referred to as 'traffic health indication' or simply 'health-indications,' denoted as 'h-indications,' for LLM domains or rails.

In some implementations, these indications may be expressed as scores or other relative indicators of conditions. For example, H-indications may be integer values ranging from "0" to "100", where "100" represents 100% healthy, indicating no congestion in the domain or on the rail, while "0" signifies 0% healthy, indicating complete blockage of the concerned component.

In various implementations, the metrics may be utilized as part of a distributed observability/monitoring architecture in place within the LLM cluster. This architecture may include a cluster controller or master node responsible for running a global traffic monitoring service, which may be referred to as 'healthd.'

Each rail switch or interconnection domain may monitor and collect its traffic load, periodically sending reports to 'healthd.' healthd may then consolidate and normalize the data from all rails and domains. It may assign a value between 0% and 100% as the traffic health indication and store this information in a global registry (e.g., global controller registry 630), such as etcd in a Kubernetes cluster, Apache ZooKeeper, Consul, etc.). (For example, the etcd stores all cluster information, such as its current state, desired state, configuration of resources, and runtime data.)

This mechanism may be independent of any specific health score calculation mechanism as congestion detection can be platform specific, such as ECN/PFC or DCQCN. Additionally, h-indication collection and distribution may occur in the control plane and may not affect real-time traffic routing or forwarding speed in the data plane. Furthermore, since traffic trending may require data collection/processing over time, distributed calculation of h-indications does not necessarily have to occur in real-time.

Additionally, each GPU (e.g., GPU g1 604 and GPU g2 606) may sync with the global registry and maintain a local registry cache 620 (e.g., 620-1 . . . 620-N). A locally maintained registry cache may facilitate each GPU to query the health indication of a specific rail 'r' as H(r) or the health indication of a domain 'd' as H (d) at any given time. After normalization, it may be the case that $0<=H(r)<=1$ and $0<=H(d)<=1$. A lower health indication value may represent a more congested condition.

A network path p in an LLM cluster may be represented as a sequence of concatenated domain/rail components, denoted as $p=c1° c2° \ldots °c_m$. Each component c in the path may be denoted as $c \in p$. In various implementations, the h-indication of a network path p may be defined as the product of the h-indication of each segment that it traverses.

This may be represented as: $H(p)=\pi c \in pH(c)$. With this relationship, when one component's health-indication value decreases, the path's health-indication value decreases proportionally. Since all the components are chained in sequence, when one component's health-indication value indicates that it is blocked (e.g., nearly zero), the whole path's health-indication would indicate that it is blocked (e.g., zero), as well. When all components' health-indications indicate that they are fully healthy (e.g., 1, 100% healthy, etc.), the whole path's health-indication would indicate full health (e.g., 1, 100% healthy, etc.). Therefore, this mathematical relationship definition may reasonably simulate the traffic condition of a routing path.

For instance, in the first case outlined above with respect to FIG. 4, G1 and G2 are within the same domain. Since the path between G1 and G2 only travels through domain d, its health-indication is also H(d). In the second case outlined above with respect to FIG. 4, the path between G1 and G2 only travels through rail g, its health-indication is H(g) (i.e., the rail connected between GPUs "g").

If a path travels domain d1 first, then goes through rail g1 to go to domain d2 to reach the destination GPU via domain d2, then this three-hop path's health-indication may be expressed as $H(d1)*H(g1)*H(d2)$. If the destination GPU is connected directly to rail g1, then the domain traffic condition should not be involved in the path health-score calculation, so $H(p)=H(d1)*H(g1)$.

Besides the health-indicators, various implementations may also introduce a metric that indicates a relative or comparative relationship between the intra-domain traffic conditions and the inter-domain rail traffic conditions of the source GPU and/or the destination GPU. In some instances, this may be referred to a health ratio, or h-ratio, $\gamma$, for each GPU G (d, g) in the cluster. This relationship may be expressed as: $\gamma(G (d, g))=H(g)/H(d)$. It may be assumed that an LLM domain will never reach zero, otherwise the corresponding GPU's γ value is infinite. This would mean that the domain is completely blocked such that no LLM operations can be performed there.

In various implementations, these metrics may be leveraged within a dynamic routing congestion model in order to make informed workload routing decisions within an LLM cluster. For example, as outlined above with respect to FIG. 5A-5B, there can be instances where routing can be accomplished utilizing multiple different routing strategies (e.g., where G1 and G2 are in different domains and on different rails). Deciding between available routing strategies may be accomplished utilizing a routing congestion model. This model may be expressed as: if γ(G1)>γ(G2): choose G1's r-interface as next hop, else: choose G1's d-interface as next hop. This may be implemented as logic or a rule in routing table 622 such that the out interface at each hop is determined based on this relationship.

This approach may be verified since it is known that when GPU1's r-interface is chosen as the next hop, its path p1 can be represented as p1=g1° d2. Meanwhile, the other choice, p2, can be represented as p2=d1° g2. Therefore, H(p1)=H(g1)*H(d2), and H(p2)=H(d1)*H(g2). Since γ(G1)>γ(G2), by definition of γ, we have H(g1)/H(d1)>H(g2)/H(d2), that is H(g1)*H(d2)>H(g2)*H(d1). Therefore, H(p1)=H(g1)*H(d2)>H(d1)*H(g2)=H(p2). Consequently, we can choose the path with higher h-indication.

In other words, when a destination GPU's h-ratio is lower than the source GPU's h-ratio, we will choose routing across the r-interface when we move an LLM workload downstream in terms of h-ratio. Conversely, we will choose routing across the d-interface when we move LLM workload upstream in terms of h-ratio.

In some instances, the introduced metrics and model may be leveraged to enhance the routing mechanism by taking advantage of other unused rail bandwidth when both the source and destination rails are busy. This has practical implications as the domain size K typically increases with technological advancements (e.g. K=8 in the A100 system but K=256 in the more recent GH200 system), which is a trend that is expected to be even more pronounced in future versions. This may result in having more rails than domains, and most LLM workload movements tend to occur at specific stages, leading to uneven utilization of the K rail bandwidth.

As such, the introduced routing mechanism may be extended to facilitate remote rail routing (e.g., routing over a rail or rails than the two rails directly connected to the source or destination GPUs). To route LLM traffic from G1(d1, g1) to G2(d2, g2) via remote rail x, a new type of path, called dxd-path, may be introduced in addition to the two types of paths (dr-path and rd-path) discussed earlier. The dxd-path may be a path that goes through GPU1's d-interface to another GPU3 (d1, x) in domain d1, then follows GPU3's r-interface to a rail x switch, reaches GPU4 (d2, x), and finally follows GPU4's d-interface to GPU2.

In essence, the routing mechanism may be extended to address under what conditions should a remote rail be used and when it is determined that remote rail use is beneficial, which rail should be used. In various implementations, the following conclusions may be drawn based on the traffic based LLM load routing model. First, if there exists a rail x such that its h-indication H(x) is larger than both the h-ratios of the source GPU and destination GPU, then it may be concluded that the path of taking remote rail x has a higher health indication than both the rd-path and the dr-path from G1 to G2.

Given a pair of source G1 and destination G2, all the rails x may be categorized as "routable rails" for the pair (G1, G2) when x satisfies H(x)>max(γ(G1), γ(G2)). This can be verified as follows: If H(x)>max(γ(G1), γ(G2)), then H(x)>γ(G1)=H(g1)/H(d1), and H(x)>γ(G2)=H (g2)/H(d2).

The h-indication of the dxd-path, $p_{dxd}$, from G1(d1, g1) to G2(d2, g2) via remote rail x is given by H($p_{dxd}$)=H(d1)*H(x)*H(d2)>H(d1)*(H(g1)/H(d1))*(d2)=H(g1)*H(d2)=H($p_{rd}$) where $p_{rd}$ is the rd-path from G1 to G2. In addition, H($p_{dxd}$)=H(d1)*H(x)*H(d2)>H(d1)*(H(g2)/H(d2))*H(d2)=H(d1)*H(g2)=H($p_{dr}$) where $p_{rd}$ is the dr-path from G1 to G2.

Therefore, $p_{dxd}$ may have a higher h-indication than $p_{rd}$ and $p_{dr}$. Consequently, it may be determined that it is beneficial to take the remote rail instead. It may be derived from these relationships that when either of the h-ratios is larger than 1, there is no need to use dxd-path.

Figure 7:
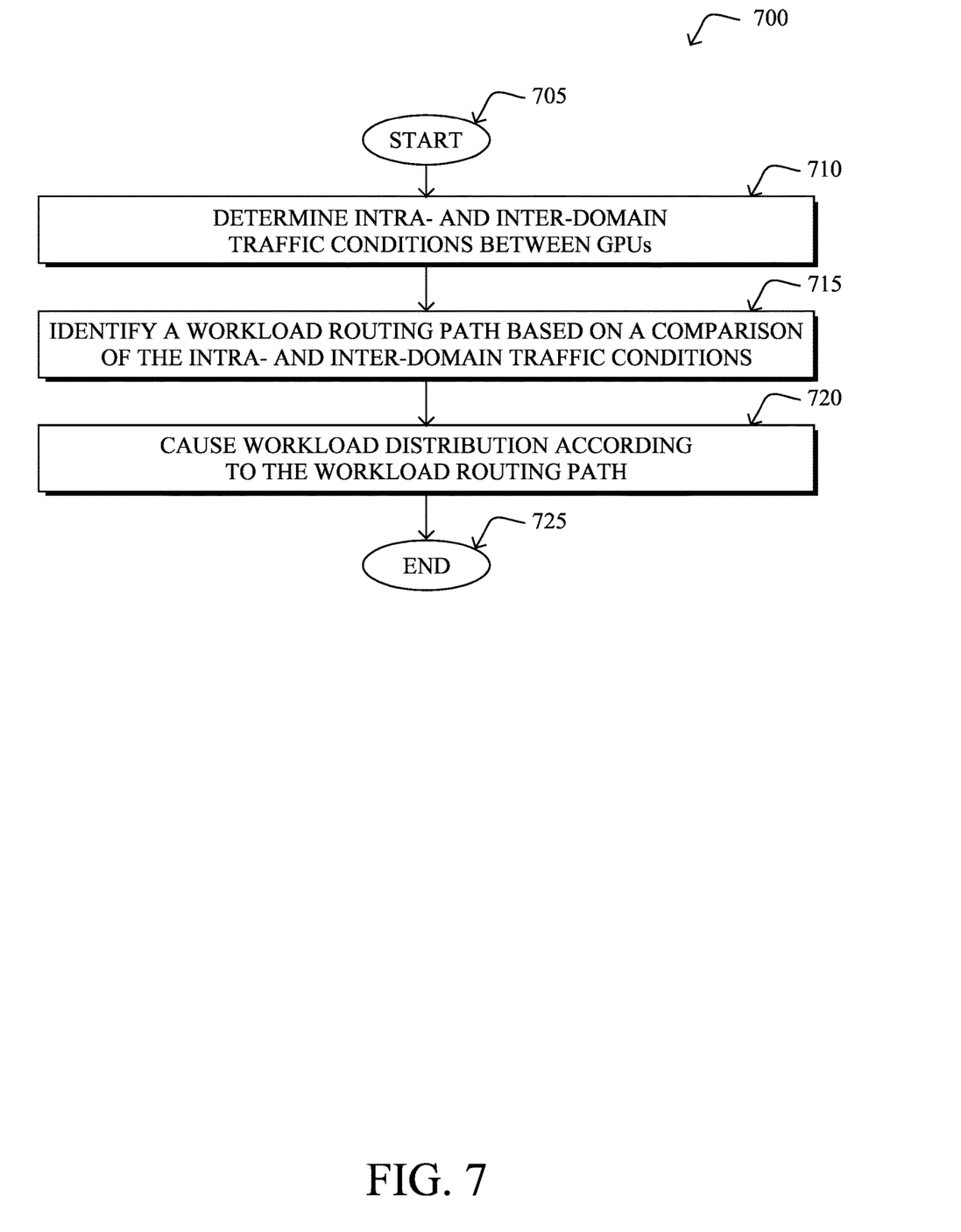
FIG. 7 illustrates an example of a procedure for traffic-based GPU load routing within LLM clusters, in accordance with one or more implementations described herein.

When there are multiple rails satisfying the condition: H(x)>max(γ(G1), γ(G2)), a rail routing choice may be made based on one or more of a plurality of approaches. For example, a best fit algorithm may be utilized. For instance, the rail with the lowest h-indication among all those whose h-indication is larger than max(γ(G1), γ(G2)) may be chosen utilizing a "best-fit" algorithm. This best-fit algorithm may be implemented by maintaining a list of all rail switches sorted by their h-indications in the global registry. This may be utilized to perform a binary search to efficiently locate a lower-bound switch with a h-indication value larger than both h-ratios. In some instances, a packet spray approach may be utilized, whereby if there are multiple rails with comparable h-indications, packet spraying may be utilized to take advantage of the RDMA property and LLM's resistance of out-of-order packet property. FIG. 7 illustrates an example simplified procedure for traffic-based GPU load routing within LLM clusters in accordance with one or more implementations described herein. For example, a non-generic, specifically configured device (e.g., device 200) may perform procedure 700 by executing stored instructions (e.g., workload routing process 248).

Procedure 700 may start at step 705, and continues to step 710, where, as described in greater detail above, a device may determine the traffic conditions of the interconnections of GPU clusters. For example, the device may, for each GPU of a GPU cluster, determine intra-domain traffic conditions of intra-domain interconnections between GPUs within their respective GPU domain of the GPU cluster and inter-domain rail traffic conditions of inter-domain interconnections to other interconnected GPU domains of the GPU cluster.

The inter-domain interconnections may include a remote direct memory access-capable network interface card connected to a rail switch interconnect communicatively connecting GPUs across domains. The intra-domain interconnections may include an any-to-any interconnect within a high-bandwidth GPU domain. The intra-domain traffic conditions and/or inter-domain rail traffic conditions may be health scores.

At step 715, procedure 700 may include identifying a workload routing path for an LLM workload. For example, a device may identify based on a comparison of the intra-domain traffic conditions and the inter-domain rail traffic conditions for a particular source GPU and a particular destination GPU, a workload routing path between the particular source GPU and the particular destination GPU.

This comparison may be based on a first ratio of the intra-domain traffic conditions and the inter-domain rail traffic conditions for the particular source GPU as compared to a second ratio of the intra-domain traffic conditions and the inter-domain rail traffic conditions for the particular destination GPU. In various implementations, the comparison of the intra-domain traffic conditions and the inter-domain rail traffic conditions for a particular source GPU and a particular destination GPU may include a specific comparison between a first ratio of a first intra-domain health score to a first inter-domain health score for the particular source GPU and a second ratio of a second intra-domain health score to a second inter-domain health score for the particular destination GPU.

In various implementations, identifying the workload routing path may include selecting a given intra-domain interconnection from the particular source GPU to a local GPU and a given inter-domain interconnection from the local GPU to the particular destination GPU, to be utilized in the workload routing path. In some instances, identifying the workload routing path may include selecting a given inter-domain interconnection of the particular source GPU to a remote GPU and a given intra-domain interconnection from the remote GPU to the particular destination GPU, to be utilized in the workload routing path. Additionally, or alternatively, identifying the workload routing path may include selecting a first intra-domain interconnection from the particular source GPU to a local GPU, a given inter-domain interconnection from the local GPU to a remote GPU, and a second intra-domain interconnection from the remote GPU to the particular destination GPU, to be utilized in the workload routing path.

At step 720, procedure 700 may include causing a workload distribution according to the identified workload routing path. For example, a device may cause an LLM workload to be distributed from the particular source GPU to the particular destination GPU according to the workload routing path. In various implementations, causing the LLM workload to be distributed may include spraying packets of the LLM workload across a plurality of inter-domain interconnections.

Procedure 700 may end at step 725.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce an LLM-workload routing architecture with generalized traffic condition metrics extensible across state-of-the-art DC network topologies for generative AI training. These metrics can then be leveraged to deliver intelligent workload routing. For instance, the "h-indication" metric that captures the traffic health (or congestion) conditions of high-bandwidth domains and rail switches can be leveraged to derive the traffic condition of an end-to-end path within a rail-only topology, forming a self-consistent and efficient-to-implement model. The metric, γ, can be utilized to represent the health ratio of the pair of the interfaces on each GPU. An optimal routing path can then be determined based on whether the metric of the source GPU and that of destination GPU is increasing or decreasing, regardless of the intermediate nodes traversed. This may significantly simplify the routing decision and facilitate efficient workload movement under dynamic traffic conditions.

Further, these techniques introduce a distributed registry to store h-indications for domains and rails, as well as derived h-ratios for GPUs in the cluster. This information is stored both at global level in a DC controller and in local GPU as a registry cache on the control plane, ensuring data-plane routing efficiency. In some instances, a list of h-indications for rails may be maintained in a sorted order to facilitate a binary search for locating "routable rails" in logarithmic time. Further, the architecture may be utilized to efficiently locate a best-fit remote rail to route the traffic when the local attached rail is congested. The mechanism can be further extended to perform packet spray when multiple remote rails having h-score larger than both source and destination h-ratios are available.

The mechanism may leverage extracted h-indication values for each rail/domain in an LLM cluster, making it independent of the internal interconnect topology and implementation of the domain and rail. Further, this mechanism may be independent of any h-indication and congestion detection algorithms which can use ECN/PFC, DCQCN, or any other platform specific methods.

In short, the described mechanism is tailored to the transportation of AI/ML workloads between GPUs within the emerging rail-only networking architecture, which connects high-bandwidth GPU nodes via rail switches. By establishing metrics that represent congestion conditions in different components within the cluster, this technique enables the use of a ratio of the traffic scores of GPUs connected to rail switches and high-bandwidth domains to determine the best path between the source GPU and destination GPU.

Therefore, the techniques provide a highly specialized routing mechanism that significantly enhances the computational efficiency of large-scale, AI-driven data centers. By employing health ratios and indications to navigate the intricate network of GPU interconnections, the system not only optimizes data flow for machine learning workloads but also provides a tangible technical improvement over conventional networking technology. These techniques provide a concrete technological solution to the challenge of executing resource-intensive stochastic gradient descent operations within the practical constraints of time and computational resources.

While there have been shown and described illustrative implementations that provide for traffic-based GPU load routing within LLM clusters, it is to be understood that various other adaptations and modifications may be made within the spirit and scope of the implementations herein. For example, while certain implementations are described herein with respect to using certain architecture, scoring schemes, types of workloads, etc., the models are not limited as such and may be used for other functions, in other implementations.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:
   determining, by a device, for each GPU of a GPU cluster, intra-domain traffic conditions of intra-domain interconnections between GPUs within their respective GPU domain of the GPU cluster and inter-domain rail traffic conditions of inter-domain interconnections to other interconnected GPU domains of the GPU cluster;
   identifying, by the device and based on a comparison of the intra-domain traffic conditions and the inter-domain rail traffic conditions for a particular source GPU and a particular destination GPU, a workload routing path between the particular source GPU and the particular destination GPU; and
   causing, by the device, an LLM workload to be distributed from the particular source GPU to the particular destination GPU according to the workload routing path.

2. The method of claim 1, wherein the comparison is based on a first ratio of the intra-domain traffic conditions and the inter-domain rail traffic conditions for the particular source GPU as compared to a second ratio of the intra-domain traffic conditions and the inter-domain rail traffic conditions for the particular destination GPU.

3. The method of claim 1, wherein the inter-domain interconnections comprise a remote direct memory access-capable network interface card connected to a rail switch interconnect communicatively connecting GPUs across domains.

4. The method of claim 1, wherein the intra-domain interconnections comprise an any-to-any interconnect within a high-bandwidth GPU domain.

5. The method of claim 1, wherein identifying the workload routing path comprises selecting a given intra-domain interconnection from the particular source GPU to a local GPU and a given inter-domain interconnection from the local GPU to the particular destination GPU, to be utilized in the workload routing path.

6. The method of claim 1, wherein identifying the workload routing path comprises selecting a given inter-domain interconnection of the particular source GPU to a remote GPU and a given intra-domain interconnection from the remote GPU to the particular destination GPU, to be utilized in the workload routing path.

7. The method of claim 1, wherein identifying the workload routing path comprises selecting a first intra-domain interconnection from the particular source GPU to a local GPU, a given inter-domain interconnection from the local GPU to a remote GPU, and a second intra-domain interconnection from the remote GPU to the particular destination GPU, to be utilized in the workload routing path.

8. The method of claim 1, wherein intra-domain traffic conditions and inter-domain rail traffic conditions comprise health scores.

9. The method of claim 8, wherein the comparison of the intra-domain traffic conditions and the inter-domain rail traffic conditions for a particular source GPU and a particular destination GPU comprise a specific comparison between a first ratio of a first intra-domain health score to a first inter-domain health score for the particular source GPU and a second ratio of a second intra-domain health score to a second inter-domain health score for the particular destination GPU.

10. The method of claim 1, wherein causing the LLM workload to be distributed comprises spraying packets of the LLM workload across a plurality of inter-domain interconnections.

11. An apparatus, comprising:
    one or more network interfaces to communicate with a network;
    a processor coupled to the one or more network interfaces and configured to execute one or more processes; and
    a memory configured to store a process that is executable by the processor, the process, when executed, configured to:
       determine, for each GPU of a GPU cluster, intra-domain traffic conditions of intra-domain interconnections between GPUs within their respective GPU domain of the GPU cluster and inter-domain rail traffic conditions of inter-domain interconnections to other interconnected GPU domains of the GPU cluster;
       identify, based on a comparison of the intra-domain traffic conditions and the inter-domain rail traffic conditions for a particular source GPU and a particular destination GPU, a workload routing path between the particular source GPU and the particular destination GPU; and
       cause an LLM workload to be distributed from the particular source GPU to the particular destination GPU according to the workload routing path.

12. The apparatus of claim 11, wherein the comparison is based on a first ratio of the intra-domain traffic conditions and the inter-domain rail traffic conditions for the particular source GPU as compared to a second ratio of the intra-domain traffic conditions and the inter-domain rail traffic conditions for the particular destination GPU.

13. The apparatus of claim 11, wherein the inter-domain interconnections comprise a remote direct memory access-capable network interface card connected to a rail switch interconnect communicatively connecting GPUs across domains.

14. The apparatus of claim 11, wherein the intra-domain interconnections comprise an any-to-any interconnect within a high-bandwidth GPU domain.

15. The apparatus of claim 11, wherein identifying the workload routing path comprises selecting a given intra-domain interconnection from the particular source GPU to a local GPU and a given inter-domain interconnection from the local GPU to the particular destination GPU, to be utilized in the workload routing path.

16. The apparatus of claim 11, wherein identifying the workload routing path comprises selecting a given inter-domain interconnection of the particular source GPU to a remote GPU and a given intra-domain interconnection from the remote GPU to the particular destination GPU, to be utilized in the workload routing path.

17. The apparatus of claim 11, wherein identifying the workload routing path comprises selecting a first intra-domain interconnection from the particular source GPU to a local GPU, a given inter-domain interconnection from the local GPU to a remote GPU, and a second intra-domain interconnection from the remote GPU to the particular destination GPU, to be utilized in the workload routing path.

18. The apparatus of claim 11, wherein intra-domain traffic conditions and inter-domain rail traffic conditions comprise health scores and wherein the comparison of the intra-domain traffic conditions and the inter-domain rail traffic conditions for a particular source GPU and a particular destination GPU comprise a specific comparison between a first ratio of a first intra-domain health score to a first inter-domain health score for the particular source GPU and a second ratio of a second intra-domain health score to a second inter-domain health score for the particular destination GPU.

19. The apparatus of claim 11, wherein causing the LLM workload to be distributed comprises spraying packets of the LLM workload across a plurality of inter-domain interconnections.

20. A tangible, non-transitory, computer-readable medium storing program instructions that cause a device to execute a process comprising:
  determining, for each GPU of a GPU cluster, intra-domain traffic conditions of intra-domain interconnections between GPUs within their respective GPU domain of the GPU cluster and inter-domain rail traffic conditions of inter-domain interconnections to other interconnected GPU domains of the GPU cluster;
  identifying, based on a comparison of the intra-domain traffic conditions and the inter-domain rail traffic conditions for a particular source GPU and a particular destination GPU, a workload routing path between the particular source GPU and the particular destination GPU; and
  causing an LLM workload to be distributed from the particular source GPU to the particular destination GPU according to the workload routing path.

* * * * *